C. E. BROMAN.
ROTARY INTERNAL COMBUSTION ENGINE.
APPLICATION FILED MAY 7, 1914.
1,140,870.                                  Patented May 25, 1915
                                                6 SHEETS—SHEET 4
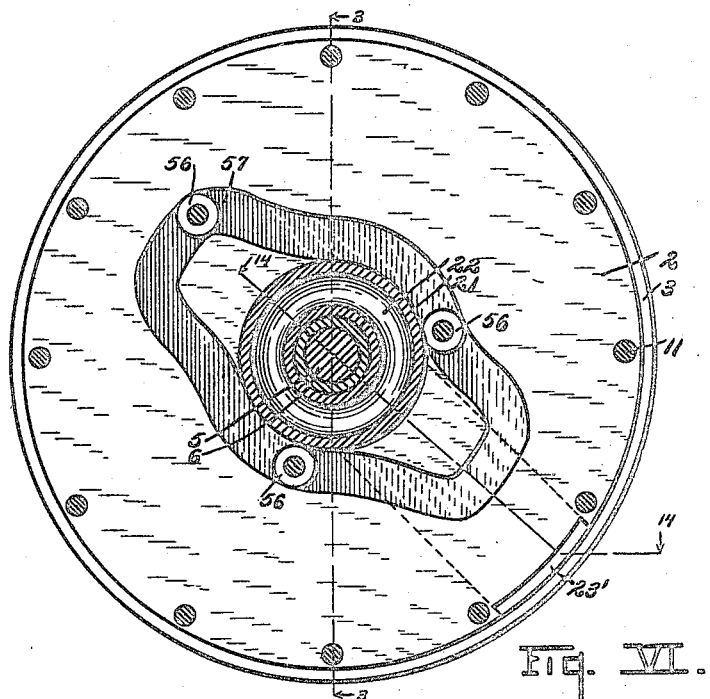
Fig. VI.
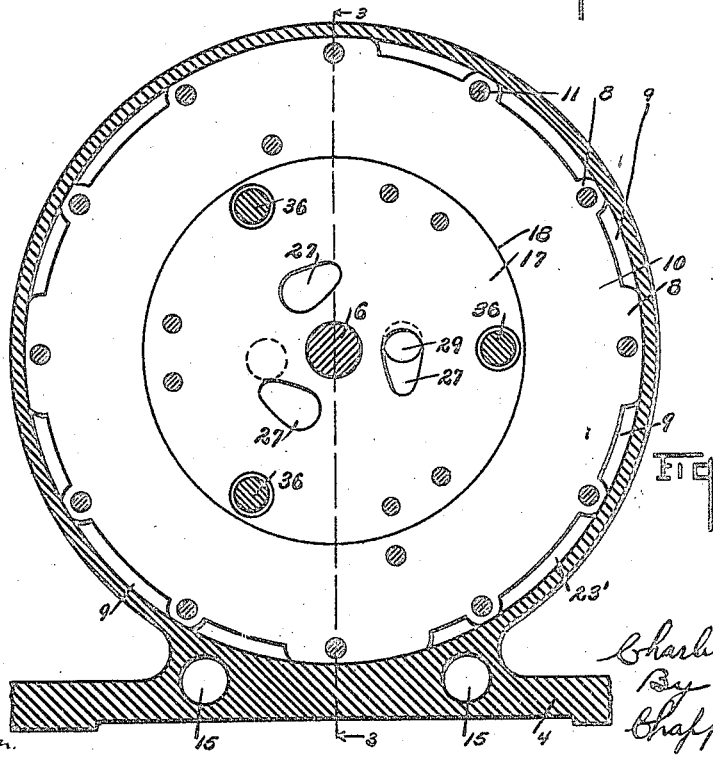
Fig. VII.

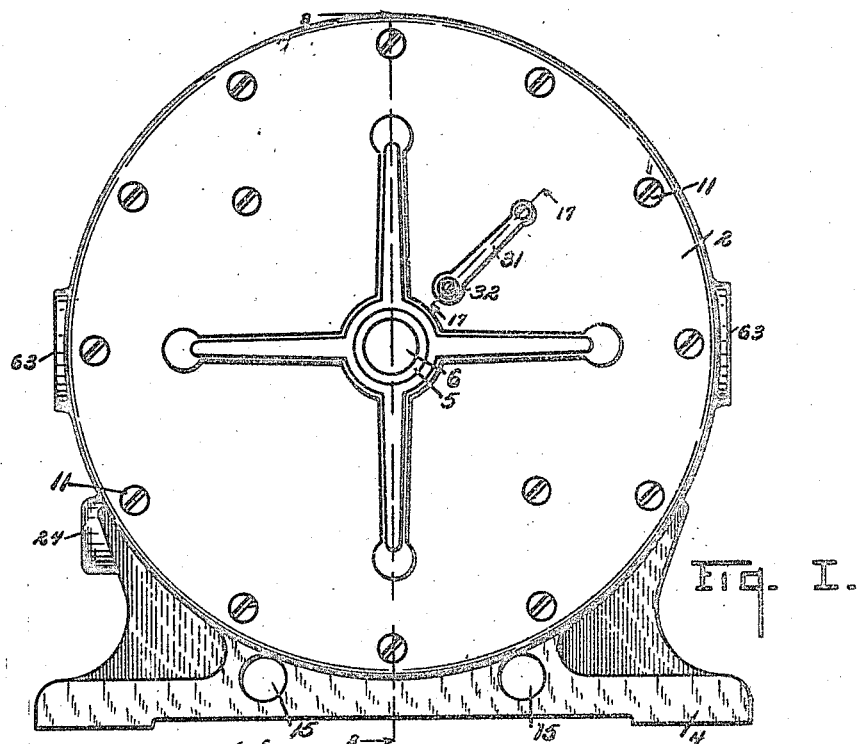
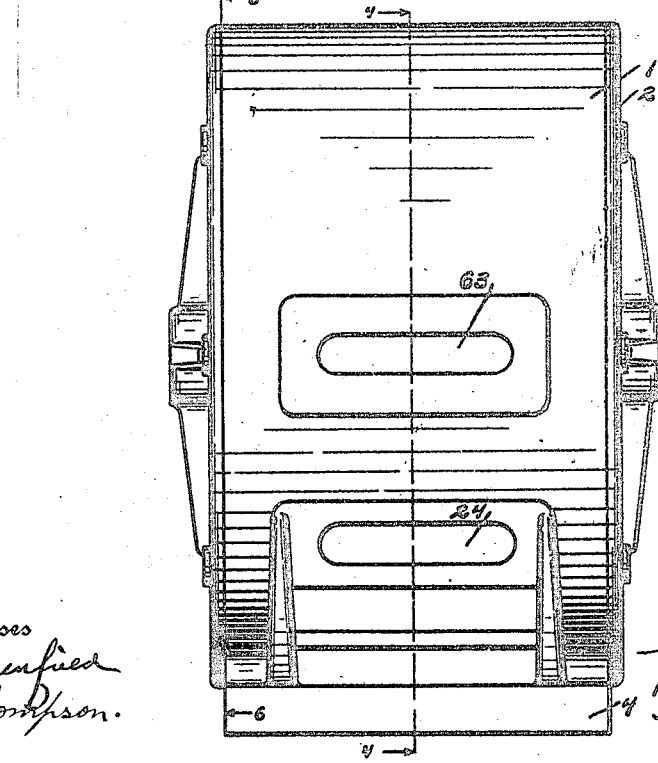

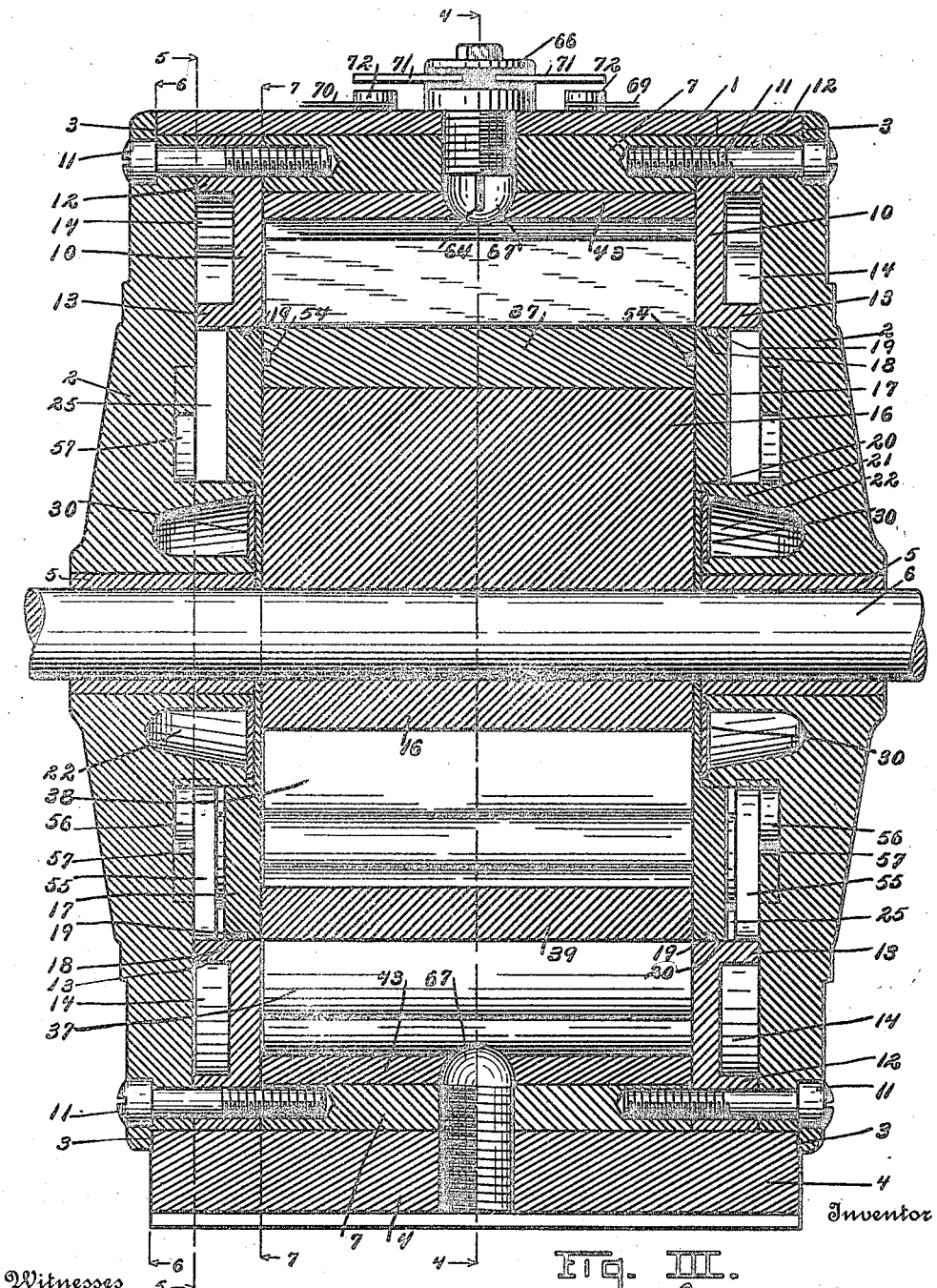
Fig. III.

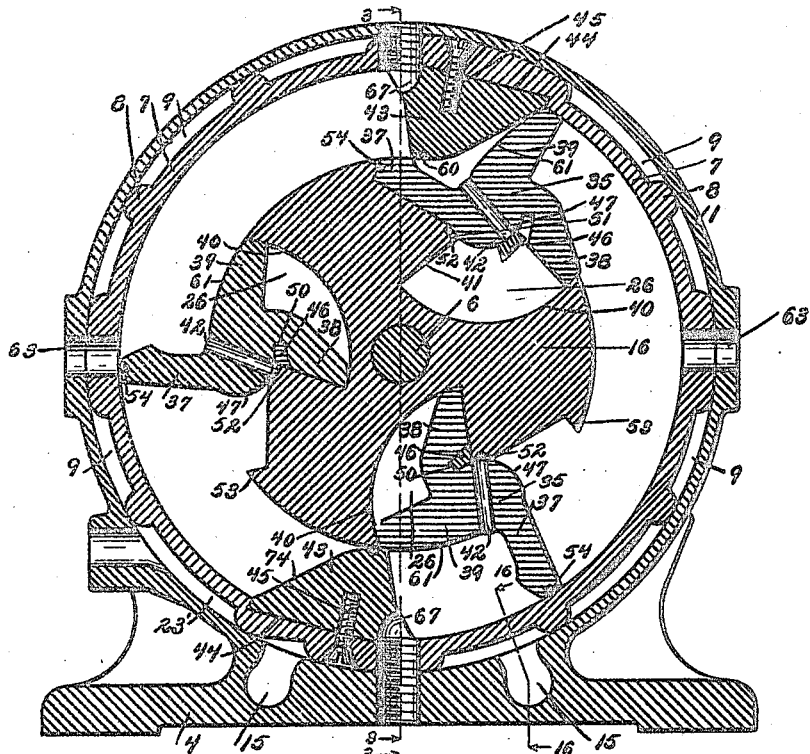
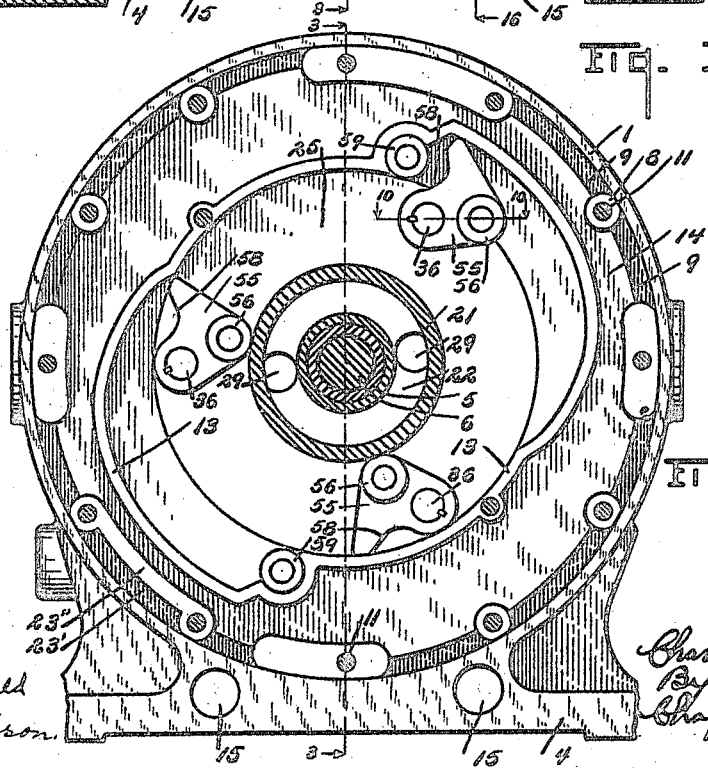

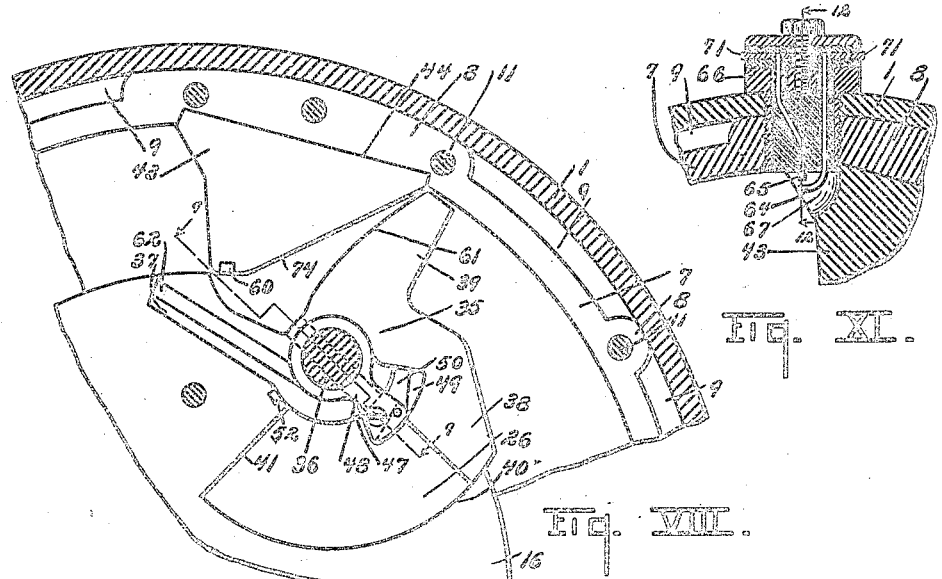

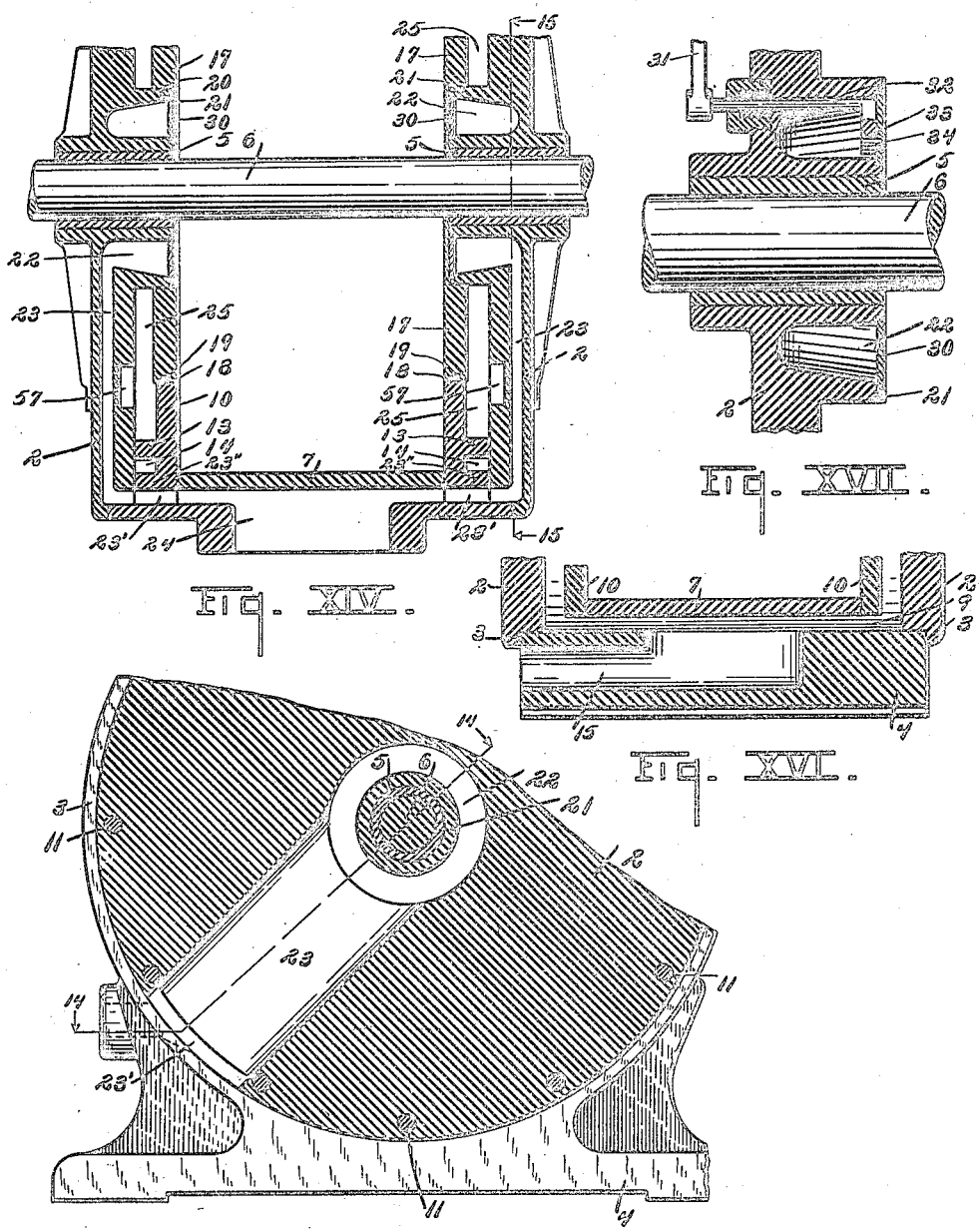

UNITED STATES PATENT OFFICE.

CHARLES E. BROMAN, OF GRAND RAPIDS, MICHIGAN.

ROTARY INTERNAL-COMBUSTION ENGINE.

1,140,870.  Specification of Letters Patent.  Patented May 25, 1915.

Application filed May 7, 1914. Serial No. 836,839.

*To all whom it may concern:*

Be it known that I, CHARLES E. BROMAN, a citizen of the United States, residing at Grand Rapids, Michigan, have invented certain new and useful Improvements in Rotary Internal-Combustion Engines, of which the following is a specification.

This invention relates to improvements in rotary internal combustion engines.

The main objects of this invention are: First, to provide an improved rotary internal combustion engine. Second, to provide an improved rotary internal combustion engine having fixed cylinder abutments. Third, to provide in a rotary internal combustion engine an improved means for delivering the gas or fuel to the combustion chamber under compression. Fourth, to provide in a rotary internal combustion engine an improved ignition means. Fifth, to provide in a rotary internal combustion engine an improved fuel feed means.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is an end view of a structure embodying the features of my invention, the ignition means and connections being omitted. Fig. II is a side view of the structure appearing in Fig. I looking from the left thereof. Fig. III is a vertical central longitudinal section on a line corresponding to line 3—3 of Figs. I, IV, V, VI and VII. Fig. IV is a vertical central transverse section on a line corresponding to line 4—4 of Figs. II and III. Fig. V is a detail transverse section on a line corresponding to line 5—5 of Fig. III. Fig. VI is a vertical transverse section on a line corresponding to line 6—6 of Figs. II and III. Fig. VII is a detail vertical transverse section on a line corresponding to line 7—7 of Fig. III. Fig. VIII is an enlarged detail transverse section on a line corresponding to line 8—8 of Fig. IX showing details of the piston or rotor and of the piston blades and abutments. Fig. IX is a detail longitudinal section taken on a line corresponding to the broken line 9—9 of Fig. VIII. Fig. X is a detail section on a line corresponding to line 10—10 of Fig. V showing details of the piston blade controlling mechanism. Fig. XI is a detail section on a line corresponding to line 11—11 of Fig. XII showing details of the ignition mechanism. Fig. XII is a detail section on a line corresponding to line 12—12 of Fig. XI showing further details of the ignition mechanism. Fig. XIII is a detail section on a line corresponding to line 13—13 of Fig. XII showing still further details of the ignition mechanism. Fig. XIV is a detail section on a line corresponding to the broken line 14—14 of Figs. VI and XV, the piston or rotor being omitted. Fig. XV is a detail section on a line corresponding to line 15—15 of Fig. XIV. Fig. XVI is a detail section on a line corresponding to line 16—16 of Fig. VI, showing details of the water connections. Fig. XVII is a detail section on a line corresponding to line 17—17 of Fig. I, showing details of the fuel feed mechanism.

In the drawing similar reference characters refer to similar parts throughout the several views, and the sectional views are taken looking in the direction of the little arrows at the ends of the section lines.

Referring to the drawing, the structure illustrated is provided with a cylindrical outer casing 1 provided with removable heads 2, the heads being shouldered at 3 to receive the casing. See Fig. III. The base 4 is formed on the bottom of the casing. The casing heads are provided with bearings 5 for the shaft 6. The cylinder 7 is disposed within the casing and provided with longitudinal peripheral ribs 8 which fit the walls of the casing centering the cylinder therein and also providing water spaces 9 between the cylinder and casing.

The annular cylinder heads 10 are clamped between the ends of the cylinder and the heads 2 of the casing, machine screws 11 being arranged through the cylinder heads and engaging the cylinder at the ribs 8 thereof. See Figs. III and VII. The heads are provided with bosses 12 for the screws 11. The cylinder heads 10 have flanges 13 which fit against the inner faces of the casing heads to provide continuous water channels 14 at each end of the cylinder. These channels communicate with the water spaces 9 so that the cylinder is practically surrounded by water for cooling purposes.

The water connections to the radiator or other suitable cooling means are through the passages 15 in the base 4 of the machine, which passages communicate with the water spaces 9 at the bottom of the cylinder. See Figs. I, IV, V, VII and XIV.

The rotor or rotary piston 16 is mounted on the shaft 6 and provided with end plates 17 which rotate within the cylinder heads 10 which have suitable finished faces 18 for the rotor heads. The rotor heads are provided with suitable packing rings 19. The rotor heads have recesses 20 on their outer sides into which the cylindrical delivery passage members 21 on the inner side of the casing heads project. See Fig. III. These members 21 have annular passages 22 therein which are connected, by conduits or passages 23 in the casing heads 2 and channels 23' formed by the walls 23" on the cylinder heads 10, to the inlet passage 24 suitably connected to the carbureter, the connection not being shown. Between the members 21 and the flange 13 of the cylinder heads are spaces or chambers 25 which contain certain mechanisms to be described.

The rotor 16 has compression chambers 26 therein, the compression chambers being preferably formed in the body of the rotor and extending from end to end thereof between the rotor end plates which form ends for the chambers 26. The end plates 17 have ports 27 therein communicating or registering with the ports 29 of the valves 30 as the rotor revolves. The valves 30 are rotatably mounted in the ends of the passage members 21. See Figs. III and VII. The valves 30 may be adjusted from the levers 31 on the rock shafts 32 which are slotted at 33 to engage the pin 34 on the valves. See Figs. I and XVII.

The piston blade members 35 are provided with journals 36 at each end journaled in the piston end plates 17. The piston blade members 35 are provided with piston plates 37, compression blades 38, and shifting or reversing blades 39. The blades 39 alternately constitute cushioning and reversing members and walls or closures for the compression chambers. The journals of the piston blade members are disposed within the circumference of the rotor 16. The sides 40 of the compression chambers 26 are in the arcs of circles so that the ends of the compression blades sweep across the same. The inner surfaces 41 of the compression chambers are preferably radial with the axes of the piston member so that the inner faces of the compression blades close against the same when the piston blades are fully extended or in firing position. See Fig. IV.

The piston blade members have slot-like ports 42 through which the compressed charges are delivered between abutments 43 and the piston blades 37. The abutments 43 are oppositely disposed in the cylinder which is provided with seats 44 therefor, the abutments being rigidly secured in their seats by screws 45.

The passages 42 are controlled by the oscillating valves 46 which oscillate on curved hub-like portions 47 of the members 35. These valves are carried by arms 48 on journals 36 of the piston members. See Figs. VIII and IX. To limit the movement of the valves the members 35 are recessed at 49. The ends of the recesses constitute stops for the arms. The plates 35 are recessed at 50 to receive the valves when they are in their open position. See Fig. IV, where two of the valves are shown in their open position and a third valve in its closed position. The curved hub portions 47 of the piston members are in bearing contact with the surface 51 at the inner end of the compression chamber, the surface being provided with a packing gasket 52 so as to provide a tight joint at this point.

When the piston blades are in their extended positions the inner ends of the ports 42 are closed by the surface 51. The rotor is recessed at 53 to receive the piston blades 37 when they are in their collapsed abutment passing position. The piston blades are provided with packing members 54. See Fig. IV.

The means for actuating the piston blade members to compress and deliver the charges and to pass the abutments consist of the control members 55 which are mounted in the chambers 25 between the rotor end plates and the casing heads. The control members are provided with rollers 56 which travel in the cam groove 57 in the casing heads, the cam groove being shaped to rock the piston members on their journals in proper sequence and at the proper time to compress and deliver the charges and to pass the abutments. The members 55 have curved surfaces 58 which coact with the rollers 59 mounted on the cylinder heads at the abutments to coact in actuating the piston members.

The cushioning blades 39 are in the extended position when the piston blades are in their collapsed position. The air trapped between the abutments and the blades 39 serves as a cushion reversing or shifting member to relieve the parts at this point. The abutments are provided with packing members 60. The front surfaces 61 of the blade 39 are curved to correspond with the curvature of the rotor and serve as closures or walls for the compression chambers when the piston blade is swung to its extended position.

During the first part of the compression strokes the valves 46 remain closed. Toward the rear ends of the compression strokes the valves are opened and the charge forced into the explosion chamber, behind the piston blade while the same is in extended position. The blades 39 serve as the inner walls of the firing or combustion chamber when the charges are fired and owing to the shape of their outer surfaces 61 a good joint is maintained between the surfaces and the inner heads of the abutments which are provided with the gaskets, as stated. The piston blades remain in their extended positions until they have passed the exhaust ports 63 when, owing to the shape of the cam 57, they are swung down into the recesses provided therefor in the rotor. This return movement of the reversing members, owing to the friction on the valve, returns the valve to its closed position.

The spark electrodes 64 and 65 are carried by the spark plug 66 arranged so that the electrodes are directly behind the abutments and in a little recess 67 formed therein for the purpose.

The contact members 68 are arranged through the cylinder and casing walls to afford connections for the circuit wires 69 and 70. The contact members 71 are mounted on the spark plug and suitably connected to the electrodes, see Figs. XI, XII and XIII. The members 68 are mounted to reciprocate in the cylinder and casing walls and have contact members 72 which engage with the members 71 when actuated by the piston or rotor blades coming into contact therewith. This insures ignition at the proper point and just as the charge is delivered under compression. While three of the piston blades are shown only two abutments are shown. These abutments, in the structure illustrated, are positioned so that the charges are not fired simultaneously but alternately. Firing pins 68 are provided with springs 73 by which the contact is broken and the pins are returned to their normal position.

Having thus described my invention I will now point out its operation. The port 24 being connected to a suitable carbureter when the rotor is rotated a charge of gas or carbureted air will pass through the ports 28 to the compression chambers as the valves register with the ports 29. The piston blade members are rocked on their journals as the rotor revolves compressing the charges in the compression chambers 26 and forcing them under pressure through the passage 42 of the combustion chamber between the abutment and the piston blade. The piston blade contacting with the firing pins actuates the same to make the contact and thereby firing the charges while the gas is still under compression. The expansion of the gases carries the rotor past the exhaust port 63 allowing the burned gases to escape. After the piston blades pass the exhaust ports the piston blade members are rocked on their journals to swing the piston blades into abutment clearing position. This swings the members 39 out so that air is trapped between the abutment and the blade. The front sides 74 of the abutments are shaped so that the front faces 61 of the cushion members rock or ride over the same without binding, the rollers 59 engaging in the surfaces 58 to assist in carrying the parts past each other and swinging the piston blade members on their compression strokes. The rear faces of the piston blades are curved or channeled to provide clearance. With this arrangement of parts the charges are delivered to the combustion chambers under suitable pressure and are fired under pressure so that full efficiency of the fuel is secured. The exhaust gases are freely exhausted without retarding the rotor. The structure is compact and moving parts are well protected so that they are not likely to be injured and, at the same time by removing the casing heads, they are all accessible. This facilitates manufacture and also repair.

I have illustrated and described my improvements in an embodiment which I regard as satisfactory under ordinary conditions. I have not attempted to illustrate or describe various modifications which I contemplate as I believe the structure illustrated will enable those skilled in the art to which my invention relates to adapt or embody the same as may be desired. I desire, however, to be understood as claiming my improvements specifically in the form illustrated as well as broadly as pointed out in the appended claims.

Having thus described my invention what I claim as new and desire to secure by Letters Patent, is:

1. In a rotary internal combustion engine, the combination with a casing comprising a cylindrical body portion provided with a base and having a fuel inlet passage and water passages therein and casing heads having fuel conduits therein communicating with said inlet passage of said casing body, said heads being provided with central inwardly projecting cylindrical passage members having annular delivery passages therein communicating with said fuel conduits, of a cylinder disposed within said casing and provided with longitudinal ribs whereby it is supported in a spaced relation to the walls of the casing to provide water spaces certain of which communicate with said water passages of said casing body, annular cylinder heads disposed between the ends of the cylinder and said casing heads and provided with outwardly projecting flanges abutting the casing heads to provide water channels communicating with the water spaces about the cylinder, a shaft, said casing heads being provided with bearings for said shaft, a rotor within said cylinder, end plates for said rotor rotating within said cylinder heads, said rotor end plates being recessed to receive the inner ends of said delivery passage members and having inlet ports therein, there being chambers between said end plates and casing heads, annular valves mounted in said delivery passage members and having ports therein with which said rotor inlet ports register as the rotor revolves, piston blades journaled in said rotor, abutments for said cylinder, and means for collapsing and extending said piston blades disposed in said chambers between said casing heads and rotor end plates.

2. In a rotary internal combustion engine, the combination with a casing comprising a cylindrical body portion provided with a base and having a fuel inlet passage and water passages therein and casing heads having fuel conduits therein communicating with said inlet passage of said casing body, said heads being provided with central inwardly projecting cylindrical passage members having annular delivery passages therein communicating with said fuel conduits, of a cylinder disposed within said casing and provided with longitudinal ribs whereby it is supported in a spaced relation to the walls of the casing to provide water spaces certain of which communicate with said water passages of said casing body, annular cylinder heads disposed between the ends of the cylinder and said casing heads and provided with outwardly projecting flanges abutting the casing heads to provide water channels communicating with the water spaces about the cylinder, a shaft, said casing heads being provided with bearings for said shaft, a rotor within said cylinder, end plates for said rotor rotating within said cylinder heads, said rotor end plates being recessed to receive the inner ends of said delivery passage members and having inlet ports therein, there being chambers between said end plates and casing heads, piston blades journaled in said rotor, abutments for said cylinder, and means for collapsing and extending said piston blades disposed in said chambers between said casing heads and rotor end plates.

3. In a rotary internal combustion engine, the combination with a casing comprising a cylindrical body portion having a fuel inlet passage and water passages therein, and casing heads having fuel conduits therein communicating with said inlet passage of said casing body, said heads being provided with central inwardly projecting passage members having delivery passages therein communicating with said fuel passages, of a cylinder disposed within said casing and provided with longitudinal ribs whereby it is supported in a spaced relation to the walls of the casing to provide water spaces certain of which communicate with said water passages of said casing body, cylinder heads disposed to provide water channels communicating with the water spaces about the cylinder, a rotor within said cylinder, end plates for said rotor having inlet ports therein, valves carried by said delivery passage members and having ports therein with which said rotor inlet ports register as the rotor revolves, piston blades for said rotor, and abutments for said cylinder.

4. In a rotary internal combustion engine, the combination with a casing comprising a cylindrical body portion having a fuel inlet passage and water passages therein, and casing heads having fuel conduits therein communicating with said inlet passage of said casing body, said heads being provided with central inwardly projecting passage members having delivery passages therein communicating with said fuel passages, of a cylinder disposed within said casing and provided with longitudinal ribs whereby it is supported in a spaced relation to the walls of the casing to provide water spaces certain of which communicate with said water passages of said casing body, cylinder heads disposed to provide water channels communicating with the water spaces about the cylinder, a rotor within said cylinder, end plates for said rotor having inlet ports therein, piston blades for said rotor, and abutments for said cylinder.

5. In a rotary internal combustion engine, the combination with a casing comprising a body portion, and casing heads having fuel conduits therein, of a cylinder disposed within said casing in a spaced relation to the walls thereof to provide a water chamber, annular cylinder heads disposed between the ends of the cylinder and said casing heads and provided with outwardly projecting flanges abutting the casing heads to provide water channels communicating with the water chamber about the cylinder, a rotor within said cylinder, end plates for said rotor rotating within said cylinder heads and having inlet ports therein communicating successively with said fuel conduits of said casing heads as the rotor revolves, there being chambers between said end plates and casing heads, piston blades journaled in said rotor, abutments for said cylinder, and means for collapsing and extending said piston blades disposed in said chambers.

6. In a rotary internal combustion engine, the combination with a casing comprising a body portion, and casing heads having fuel conduits therein, of a cylinder disposed within said casing in a spaced relation to the walls thereof to provide a water chamber, cylinder heads disposed to provide water channels communicating with the water chamber about the cylinder, a rotor within said cylinder, end plates for said rotor having inlet ports therein communicating successively with said fuel conduits of said casing heads as the rotor revolves, piston blades for said rotor, and abutments for said cylinder.

7. In an internal combustion engine, the combination with a casing comprising a body portion having a fuel inlet passage therein, and heads for said casing having fuel conduits therein communicating with said inlet passage of said casing body and provided with inwardly projecting delivery passage members having annular delivery passages therein communicating with said conduits, a cylinder arranged within said casing, annular heads for said cylinder, a rotor within said cylinder having compression chambers therein, end plates for said rotor arranged to rotate within said cylinder heads and to close the ends of said compression chambers, said end plates being recessed to receive said delivery passage members, and being provided with ports opening into said compression chambers, valves for said delivery passages having ports therein with which said ports of said rotor end plates register as the rotor revolves, piston members provided with piston blades and compression blades journaled in said rotor end plates within the periphery of said rotor, said piston members being provided with ports delivering from said compression chambers, abutments for said cylinder, and means for actuating said piston members as the rotor revolves.

8. In an internal combustion engine, the combination with a casing comprising a body portion having a fuel inlet passage therein, and heads for said casing having fuel conduits therein communicating with said inlet passage of said casing body and provided with inwardly projecting delivery passage members having annular delivery passages therein communicating with said conduits, a cylinder arranged within said casing, annular heads for said cylinder, a rotor within said cylinder having compression chambers therein, end plates for said rotor arranged to rotate within said cylinder heads and to close the ends of said compression chambers, said end plates being recessed to receive said delivery passage members, and being provided with ports opening into said compression chambers, piston members provided with piston blades and compression blades journaled in said rotor end plates within the periphery of said rotor, said piston members being provided with ports delivering from said compression chambers, abutments for said cylinder, and means for actuating said piston members as the rotor revolves.

9. In an internal combustion engine, the combination of a casing comprising a body portion, and heads for said casing having fuel conduits therein, a cylinder arranged within said casing, annular heads for said cylinder, abutments within said cylinder, a rotor within said cylinder having peripheral compression chambers therein, end plates for said rotor arranged to rotate within said cylinder heads and to close the ends of said compression chambers, said end plates being provided with ports opening into said compression chambers and communicating with said fuel conduits as the rotor revolves, piston members provided with piston blades and compression blades, journaled in said rotor end plates within the periphery of said rotor, said piston members being provided with delivery ports for said compression chambers, and means for controlling said piston members.

10. In an internal combustion engine, the combination of a casing comprising a body portion, and heads for said casing having fuel conduits therein, a cylinder arranged within said casing, annular heads for said cylinder, a rotor within said cylinder having peripheral compression chambers therein, end plates for said rotor arranged to rotate within said cylinder heads and to close the ends of said compression chambers, said end plates being provided with ports opening into said compression chambers and communicating with said fuel conduits as the rotor revolves, piston members provided with piston blades and compression blades journaled in said rotor end plates within the periphery of said rotor, said piston members being provided with delivery ports for said compression chambers, valves for said ports carried by arms mounted for oscillating movement on said piston member journals, stops on said piston members limiting movement of said valves, fixed abutments within said cylinder, and means for controlling said piston members.

11. In an internal combustion engine, the combination with a casing comprising a body portion having a fuel inlet passage therein, and heads for said casing having fuel conduits therein communicating with said inlet passage of said casing body and provided with inwardly projecting delivery passage members having passages therein communicating with said conduit, a cylinder arranged within said casing, a rotor within said cylinder provided with compression chambers having inlet ports at the ends thereof registering with the delivery ports of said delivery passage members as the rotor revolves, piston members provided with piston blades and compression blades journaled in said rotor, abutments for said cylinder, and means for actuating said piston members as the rotor revolves.

12. In an internal combustion engine, the combination of a casing comprising a body portion, and heads having fuel conduits therein, a cylinder arranged within said casing, a rotor within said cylinder having compression chambers therein, end plates for said rotor provided with ports opening into said compression chambers and communicating with said fuel conduits of said head, piston members provided with piston blades and compression blades journaled in said rotor end plates, said piston members being provided with ports delivering from said compression chambers to the combustion chambers of the cylinder, and means for actuating said piston members, comprising control members mounted on the piston members within said casing and cams on said casing heads coacting with said control members.

13. In an internal combustion engine, the combination of a casing comprising a body portion, and heads having fuel conduits therein, a cylinder arranged within said casing, a rotor within said cylinder having compression chambers therein, said rotor being provided with ports communicating successively with said conduits in said casing heads, piston members provided with piston blades and compression blades journaled in said rotor, said piston members being provided with ports delivering from said compression chambers to the combustion chambers of the cylinder, and means for actuating said piston members, comprising control members mounted on the piston members within said casing and cams on said casing heads coacting with said control members.

14. In an internal combustion engine, the combination of a cylinder, abutments within said cylinder, a rotor within said cylinder, piston members journaled on said rotor, control members on said piston members, control cam members having cam grooves therein, rollers on said control members traveling in said cam grooves, and rollers positioned at the abutments to engage said reversing members, said reversing members being provided with cams coacting with said rollers positioned at the abutments.

15. In an internal combustion engine, the combination of a cylinder, fixed abutments within said cylinder, a rotor, piston members mounted on said rotor within said cylinder for oscillating movement, control members on said piston members, rollers on said control members, control cam members with which rollers coact, and rollers positioned at the abutments to engage said control members, said control members being provided with cams coacting with said rollers positioned at the abutments.

16. In an internal combustion engine, the combination of a cylinder, fixed abutments within said cylinder, said cylinder being provided with exhaust ports between said abutments, a cylindrical rotor within said cylinder having peripheral compression chambers and piston blade recesses therein, rotating within the casing with its periphery close to the inner ends of said abutments, piston members journaled on said rotor for oscillating movement and provided with piston blades, compression blades and shifting blades, said blades being positioned so that the shifting blades swing into the compression chambers and constitute walls therefor when the piston blades are extended and swing to extended position and constitute cushioning members when the piston blades are collapsed into their said recesses, said piston members being provided with ports delivering between the piston and shifting blades and opening into the compression chambers in front of the compression blades, sliding valves for said ports, there being recesses at the bases of the compression blades adapted to receive the valves when they are open, means for operating said valves as the piston members are actuated, and means for actuating said piston members as the rotor revolves.

17. In an internal combustion engine, the combination of a cylinder, fixed abutments within said cylinder, said cylinder being provided with exhaust ports between said abutments, a cylindrical rotor within said cylinder having peripheral compression chambers and piston blade recesses therein, rotating within the casing with its periphery close to the inner ends of said abutments, piston members journaled on said rotor for oscillating movement and provided with piston blades, compression blades and shifting blades, said blades being positioned so that the shifting blades swing into the compression chambers and constitute walls therefor when the piston blades are extended and swing to extended position and constitute cushioning members when the piston blades are collapsed into their said recesses, said piston members being provided with ports delivering between the piston and shifting blades and opening into the compression chambers in front of the compression blades, valves for said ports, means for operating said valves as the piston members are actuated, and means for actuating said piston members as the rotor revolves.

18. In an internal combustion engine, the combination of a cylinder, fixed abutments within said cylinder, the front sides of said abutments being inclined rearwardly, said cylinder being provided with exhaust ports between said abutments, a cylindrical rotor within said cylinder having peripheral compression chambers and piston blade recesses therein, rotating within the casing with its periphery close to the inner ends of said abutments, piston members journaled on said rotor for oscillating movement and provided with piston blades, compression blades and shifting blades, said blades being positioned so that the shifting blades swing into the compression chambers and constitute walls therefor when the piston blades are extended and swing to extended position and constitute cushioning members when the piston blades are collapsed into their said recesses, the front sides of said shifting blades being curved to correspond to the curvature of the rotor, the piston blades being curved on their rear faces to provide clearance for the ends of the abutments as the piston blades are swung to their extended positions, said piston members being provided with ports delivering between the piston and shifting blades and opening into the compression chambers in front of the compression blades, valves for said ports, means for operating said valves as the piston members are actuated, and means for actuating said piston members as the rotor revolves.

19. In an internal combustion engine, the combination of a cylinder, fixed abutments within said cylinder, the front sides of said abutments being inclined rearwardly, said cylinder being provided with exhaust ports between said abutments, a cylindrical rotor within said cylinder having peripheral compression chambers and piston blade recesses therein, rotating within the casing with its periphery close to the inner ends of said abutments, piston members journaled on said rotor for oscillating movement and provided with piston blades, compression blades and shifting blades, said blades being positioned so that the shifting blades swing into the compression chambers and constitute walls therefor when the piston blades are extended and swing to extended position and constitute cushioning members when the piston blades are collapsed into their said recesses, the front sides of said shifting blades being curved to correspond to the curvature of the rotor, the piston blades being curved on their rear faces to provide clearance for the ends of the abutments as the piston blades are swung to their extended positions, said piston members being provided with ports delivering between the piston and shifting blades and opening into the compression chambers in front of the compression blades and means for actuating said piston members as the rotor revolves.

20. In an internal combustion engine, the combination of a cylinder, fixed abutments within said cylinder, said cylinder being provided with exhaust ports between said abutments, a cylindrical rotor within said cylinder having peripheral compression chambers and piston blade recesses therein, rotating within the casing with its periphery close to the inner ends of said abutments, piston members journaled on said rotor for oscillating movement and provided with piston blades, compression blades and shifting blades, said blades being positioned so that the shifting blades swing into the compression chambers and constitute walls therefor when the piston blades are extended and swing to extended position and constitute cushioning members when the piston blades are collapsed into their said recesses, said piston members being provided with ports delivering between the piston and shifting blades and opening into the compression chambers in front of the compression blades and means for actuating said piston members as the rotor revolves.

21. In an internal combustion engine, the combination of a cylinder, fixed abutments within said cylinder, a rotor within said cylinder having compression chambers therein, inlet connections for said compression chambers, piston members journaled for oscillating movement within the periphery of said rotor and provided with piston blades, compression blades, and shifting blades, the said shifting blades being extended and constituting cushioning and reversing members when the piston blades are collapsed and being collapsed into the compression chambers and constituting the outer walls thereof when the piston blades are erected, said piston members being provided with ports delivering between the piston and the shifting blades and opening into the compression chambers in front of the compression blades, valves for said ports mounted for oscillating movement upon the actuation of said piston members, means for actuating said piston members and an ignition means actuated by the piston blades when they are extended.

22. In an internal combustion engine, the combination of a cylinder, fixed abutments within said cylinder, a rotor within said cylinder having compression chambers therein, inlet connections for said compression chambers, piston members journaled for oscillating movement within the periphery of said rotor and provided with piston blades, compression blades, and shifting blades, the said shifting blades being extended and constituting cushioning and reversing members when the piston blades are collapsed and being collapsed into the compression chambers and constituting the outer walls thereof when the piston blades are erected, means for actuating said piston members and an ignition means actuated by the piston blades when they are extended.

23. In an internal combustion engine, the combination of a cylinder, fixed abutments within said cylinder, a rotor within said cylinder having compression chambers therein, inlet connections for said compression chambers, piston members journaled for oscillating movement within the periphery of said rotor and provided with piston blades, compression blades, and shifting blades, the said shifting blades being extended and constituting cushioning and reversing members when the piston blades are collapsed and being collapsed into the compression chambers and constituting the outer walls thereof when the piston blades are erected, said piston members being provided with ports delivering between the piston and the shifting blades and opening into the compression chambers in front of the compression blades, valves for said ports mounted for oscillating movement upon the actuation of said piston members and means for actuating said piston members.

24. In an internal combustion engine, the combination of a cylinder, fixed abutments within said cylinder, a rotor within said cylinder having compression chambers therein, inlet connections for said compression chambers, piston members journaled for oscillating movement within the periphery of said rotor and provided with piston blades, compression blades, and shifting blades, the said shifting blades being extended and constituting cushioning and reversing members when the piston blades are collapsed and being collapsed into the compression chambers and constituting the outer walls thereof when the piston blades are extended and means for actuating said piston members.

25. In an internal combustion engine, the combination of a cylinder, fixed abutments within said cylinder, a rotor within said cylinder having peripheral compression chambers therein, piston members journaled on said rotor for oscillating movement and provided with piston blades, compression blades and members constituting outer walls for the compression chambers when the piston blades are extended, said piston members being provided with delivery ports for said compression chambers, sliding valves for said ports, there being recesses at the bases of the compression blades adapted to receive the valves when they are open, means for operating said valves as the piston members are actuated, and means for actuating said piston members as the rotor revolves.

26. In an internal combustion engine, the combination of a cylinder, fixed abutments within said cylinder, a rotor within said cylinder having peripheral compression chambers therein, piston members journaled on said rotor for oscillating movement and provided with piston blades, compression blades and members constituting outer walls for the compression chambers when the piston blades are extended, said piston members being provided with delivery ports for said compression chambers, valves for said ports, means for operating said valves as the piston members are actuated, and means for actuating said piston members as the rotor revolves.

27. In an internal combustion engine, the combination of a cylinder, fixed abutments within said cylinder, a rotor within said cylinder having peripheral compression chambers therein, piston members journaled on said rotor for oscillating movement and provided with piston blades, compression blades and members constituting outer walls for the compression chambers when the piston blades are extended, and means for actuating said piston members as the rotor revolves.

28. In an internal combustion engine, the combination of a cylinder, abutments within said cylinder, a cylindrical rotor within said cylinder having peripheral compression chambers and piston blade recesses therein, piston members journaled on said rotor for oscillating movement and provided with piston blades and compression blades, said piston members being provided with delivery ports for said compression chambers, sliding valves for said ports, there being recesses at the bases of the compression blades adapted to receive the valves when they are open, means for operating said valves as the piston members are actuated, and means for actuating said piston members as the rotor revolves.

29. In an internal combustion engine, the combination of a cylinder, abutments within said cylinder, a cylindrical rotor within said cylinder having peripheral compression chambers and piston blade recesses therein, piston members journaled on said rotor for oscillating movement and provided with piston blades and compression blades, said piston members being provided with delivery ports for said compression chambers, valves for said ports, means for operating said valves as the piston members are actuated, and means for actuating said piston members as the rotor revolves.

30. In an internal combustion engine, the combination of a cylinder, abutments within said cylinder, a cylindrical rotor within said cylinder having peripheral compression chambers and piston blade recesses therein, piston members journaled on said rotor for oscillating movement and provided with piston blades and compression blades, and means for actuating said piston members as the rotor revolves.

31. In an internal combustion engine, the combination of a cylinder, fixed abutments within said cylinder, a rotor within said cylinder having peripheral compression chambers therein, piston members journaled for oscillating movement within the periphery of said rotor and provided with piston blades, compression blades, and shifting blades, the said shifting blades being extended and constituting reversing members when the piston blades are collapsed and being collapsed into the compression chambers and constituting the outer walls thereof when the piston blades are extended and means for actuating said piston members.

32. In an internal combustion engine, the combination of a cylinder, fixed abutments within said cylinder, said cylinder having exhaust ports between said abutments, a rotor within said cylinder having peripheral compression chambers therein, end plates for said rotor closing the ends of said chambers and provided with fuel inlet ports opening into said compression chambers, piston members journaled in said rotor end plates within the periphery of the rotor and provided with piston blades and compression blades, said piston members being provided with ports delivering at the rear of the piston blades and opening into compression chambers in front of the compression blades, valves for said ports carried by arms mounted for oscillation on the said piston member journals, stops on said piston members limiting the movement of said valves, there being recesses at the bases of the compression blades adapted to receive the valves, and means for actuating said piston member journals on the outer sides of said rotor end plates.

33. In an internal combustion engine, the combination of a cylinder, abutments within said cylinder, a rotor within said cylinder having compression chambers, piston members journaled in said rotor and provided with piston blades and compression blades, said piston members being provided with ports delivering at the rear of the piston blades and opening into compression chambers in front of the compression blades, valves for said ports carried by arms mounted for oscillation on the said piston member journals, stops on said piston members limiting the movement of said valves, and means for actuating said piston members.

34. In an internal combustion engine, the combination of a cylinder, a rotor within said cylinder having compression chambers, rotatably mounted piston members on said rotor and provided with piston blades and compression blades, and means for actuating said piston members, comprising control members mounted on said piston members and cams coacting with said control members.

35. In an internal combustion engine, the combination of a cylinder, a rotor within said cylinder having compression chambers, rotatably mounted piston members on said rotor and provided with piston blades and compression blades, and means for actuating said piston members.

36. In an internal combustion engine, the combination of a cylinder, a rotor within said cylinder having compression chambers therein, end plates for said rotor provided with ports opening into said compression chambers, piston members journaled in said rotor end plates and provided with piston blades and compression blades, said piston members being provided with ports delivering from said compression chambers, and means for actuating said piston members, comprising control members mounted on the outer ends of said piston member journals and members coacting therewith.

37. In an internal combustion engine, the combination of a cylinder, a rotor within said cylinder having compression chambers therein, end plates for said rotor, piston members journaled in said rotor end plates and provided with piston blades and compression blades, and means for actuating said piston members, comprising control members mounted on the outer ends of said piston member journals and members coacting therewith.

38. In an internal combustion engine, the combination of a cylinder, abutments within said cylinder, a rotor within said cylinder having compression chambers, piston members journaled in said rotor and provided with piston blades and compression blades, said piston members being provided with ports delivering at the rear of the piston blades and opening into the compression chambers in front of the compression blades, means for actuating said piston members, and valves for said ports actuated by the oscillation of said piston members.

39. In an internal combustion engine, the combination of a cylinder, abutments within said cylinder, a rotor within said cylinder having compression chambers, piston members journaled in said rotor and provided with piston blades and compression blades and means for actuating said piston members.

In witness whereof, I have hereunto set my hand and seal in the presence of two witnesses.

CHARLES E. BROMAN. [L. S.]

Witnesses:
CHARLES E. CLAYTON,
RALEIGH A. GILBERT.